(12) United States Patent
Vogt et al.

(10) Patent No.: US 12,138,700 B2
(45) Date of Patent: Nov. 12, 2024

(54) NON-CONTACT TEMPERATURE SENSOR FOR SAW GUIDES

(71) Applicant: Precision Guide Machinery and Repair Limited, Prince George (CA)

(72) Inventors: Nalynd Vogt, Prince George (CA); Carrick Bergen, Prince George (CA)

(73) Assignee: Precision Guide Machinery and Repair Limited, Prince George (CA)

( * ) Notice: Subject to any disclaimer, the term of this patent is extended or adjusted under 35 U.S.C. 154(b) by 454 days.

(21) Appl. No.: 17/424,157

(22) PCT Filed: Feb. 3, 2020

(86) PCT No.: PCT/CA2020/050123
§ 371 (c)(1),
(2) Date: Jul. 19, 2021

(87) PCT Pub. No.: WO2020/160645
PCT Pub. Date: Aug. 13, 2020

(65) Prior Publication Data
US 2022/0097155 A1    Mar. 31, 2022

Related U.S. Application Data

(60) Provisional application No. 62/801,084, filed on Feb. 4, 2019.

(51) Int. Cl.
*B23D 59/00* (2006.01)
*B23D 59/02* (2006.01)
(Continued)

(52) U.S. Cl.
CPC ........... *B23D 59/001* (2013.01); *B23D 59/02* (2013.01); *G01K 1/024* (2013.01); *G01K 1/14* (2013.01); *G01K 13/08* (2013.01)

(58) Field of Classification Search
CPC .... B23D 59/001; B23D 59/008; B23D 59/02; B23D 59/04; B23D 47/005; B27B 5/34;
(Continued)

(56) References Cited

U.S. PATENT DOCUMENTS 3,623,520 A * 11/1971 Neild .................. B27B 13/10
83/441.1
4,567,798 A    2/1986 Brdicko
(Continued)

FOREIGN PATENT DOCUMENTS

WO    WO-2016157111 A1 * 10/2016 ............... G01K 1/14

OTHER PUBLICATIONS

Merriam-Webster.com, definition of 'embed', obtained on Oct. 17, 2023 from https://www.merriam-webster.com/dictionary/embed.*
(Continued)

*Primary Examiner* — Evan H MacFarlane
(74) *Attorney, Agent, or Firm* — ARC IP Law, PC; Joseph J. Mayo

(57) ABSTRACT

A saw guide for a saw arbor guide assembly comprises a head, a body, a pad, and one or more temperatures sensors. The saw guide comprises one or more sensor channels extending between first and second faces thereof. The pad extends across at least one of the first and second faces, and the pad comprises one or more pad channels. The pad faces a corresponding saw blade. Each of the temperature sensors is located within one of the sensor channels. In addition, each of the temperature sensors comprises a sensor body, a tip, and a thermocouple. The tip extends from the sensor body and is adapted to extend, at least partially, through one of the pad channels and be spaced apart from the corresponding saw blade. The thermocouple is enclosed within the tip, with the thermocouple configured to measure changes in temperature of the corresponding saw blade.

20 Claims, 7 Drawing Sheets

(51) Int. Cl.
   *G01K 1/024* (2021.01)
   *G01K 1/14* (2021.01)
   *G01K 13/08* (2006.01)
(58) Field of Classification Search
   CPC ...... B27B 5/38; B23Q 17/0985; G01K 1/024; G01K 1/14; G01K 1/143; G01K 13/04; G01K 13/08
   See application file for complete search history.

(56) References Cited

U.S. PATENT DOCUMENTS

| | | |
|---|---|---|
| 4,635,513 A | 1/1987 | McGeehee |
| 5,028,145 A | 7/1991 | Borkenhagen et al. |
| 2016/0008897 A1 | 1/2016 | McGehee |
| 2019/0353535 A1 | 11/2019 | Bonac et al. |
| 2020/0100958 A1* | 4/2020 | Wiznia .................. A61F 15/02 |

OTHER PUBLICATIONS

Thesaurus.com, synonyms for 'embed', obtained on Oct. 17, 2023 from https://www.thesaurus.com/browse/embed.*
International Search Report and Written Opinion issued in PCT/CA2020/050123 dated May 28, 2020.

* cited by examiner

NON-CONTACT TEMPERATURE SENSOR FOR SAW GUIDES

FIELD OF THE INVENTION

The present invention relates to temperature sensors for use with saw guides, and in particular, to non-contact temperature sensors for use with saw guides.

BACKGROUND OF THE INVENTION

In a typical gang saw, a plurality of parallel circular saw blades is mounted on a rotating arbor to form a gang saw assembly. A saw guide assembly is provided for each gang saw assembly. The saw guide assembly comprises a plurality of saw guides attached to a guide post. The saw guides and the saw blades are configured such that each saw blade engages the saw guide assembly in between two adjacent saw guides. The saw blades rotate at high speeds in order to cut logs into individual boards.

It is helpful to be able to measure and monitor the temperature of the saw blades during both "cut" and "non-cut" times. For example, if a saw blade becomes too hot, it may have very adverse consequences to the general state of the equipment (i.e. the saw blades itself and the saw guides) and to the quality of the resulting product. In particular, high temperatures may result in early failure of the saw blades and/or the saw guides.

By monitoring the temperature of the saw blades, it is possible to take preventive action before their temperature becomes critical. For example, a fluid comprising an oil/water mixture is typically supplied to the saw guides to provide a cooling effect for the saw blades and saw guides. If it is determined that a saw blade is too hot, it may be possible to adjust the particular oil/water ratio of the fluid supplied to the saw guide in order to counteract the high temperature.

SUMMARY OF THE INVENTION

In accordance with one embodiment of the invention, a saw guide in accordance with the invention comprises a generally cylindrical channel adapted to fit a temperature sensor unit. The temperature sensor unit is generally cylindrical in shape and comprises a tip extending from an end. The tip is preferably made of a metallic material and encloses a thermocouple for measuring temperature. The tip may be machine finished so that there is an appropriate clearance between the surface of the tip and the saw blade.

In a further embodiment, a saw guide for a saw arbor guide assembly with one or more arbors, one or more guide posts, and a plurality of saw blades arranged on the one or more arbors is provided. The saw guide comprises a head, a body, a pad, and one or more temperatures sensors. The head is adapted to attach to one of the one or more guide posts. The body extends from the head and comprises first and second faces and one or more sensor channels extending between the first and second faces. The pad extends across at least one of the first and second faces, and the pad comprises one or more pad channels. The pad faces a corresponding one of the plurality of saw blades. Each of the one or more temperature sensors is located within one of the one or more sensor channels. In addition, each of the one or more temperature sensors comprises a sensor body, a tip, and a thermocouple. The tip extends from the sensor body and is adapted to extend, at least partially, through one of the pad channels and be spaced apart from the corresponding one of the plurality of saw blades. The thermocouple is enclosed within the tip, with the thermocouple configured to measure changes in temperature of the corresponding one of the plurality of saw blades.

In still a further embodiment, the pad is made of Babbitt material.

In yet still a further embodiment, the pad further comprises an inner region with a first thickness and a surrounding outer region with a second thickness. The first thickness is less than the second thickness.

In still yet a further embodiment, the pad comprises one or more fluid channels adapted to convey cooling fluid into the inner region.

In another embodiment, the sensor body is substantially cylindrical.

In still another embodiment, the tip is made of a conductive material.

In still yet another embodiment, the tip is made of a metallic material.

In a further embodiment, the tip is spaced apart from the corresponding one of the plurality of saw blades by between 0.0010 and 0.0030 inches.

In still a further embodiment, the tip is spaced apart from the corresponding one of the plurality of saw blades by approximately 0.0015 inches.

In still yet a further embodiment, the temperature sensor further comprises a transceiver for transmitting temperature data comprising the changes in temperature measured by the thermocouple.

In a further embodiment, a system for recording changes in temperatures of a saw blade in a saw arbor guide assembly is provided. The system comprises a saw guide, a pad, one or more temperature sensors, and a gateway. The saw guide comprises first and second faces and one or more sensor channels extending between the first and second faces. The pad extends across at least one of the first and second faces, and the pad comprises one or more pad channels. The pad faces the saw blade. Each of the one or more temperature sensors is located within one of the one or more sensor channels. Each of the one or more temperature sensors comprises a sensor body, a tip, a thermocouple, and a transceiver. The tip extends from the sensor body and is adapted to extend, at least partially, through one of the pad channels and be spaced apart from the saw blade. The thermocouple is enclosed within the tip, with the thermocouple configured to measure changes in temperature of the saw blade. The transceiver transmits temperature data comprising changes in temperature of the saw blade. The gateway is configured to receive the temperature data.

In still a further embodiment, the gateway is further configured to generate a warning if the temperature data indicates that the change in temperature of the saw blade is greater than a pre-set amount.

The foregoing was intended as a summary only and of only some of the aspects of the invention. It was not intended to define the limits or requirements of the invention. Other aspects of the invention will be appreciated by reference to the detailed description of the preferred embodiments.

BRIEF DESCRIPTION OF THE DRAWINGS

The invention will be described by reference to the detailed description of the embodiments and to the drawings thereof in which.

DETAILED DESCRIPTION OF THE INVENTION

Figure 1:
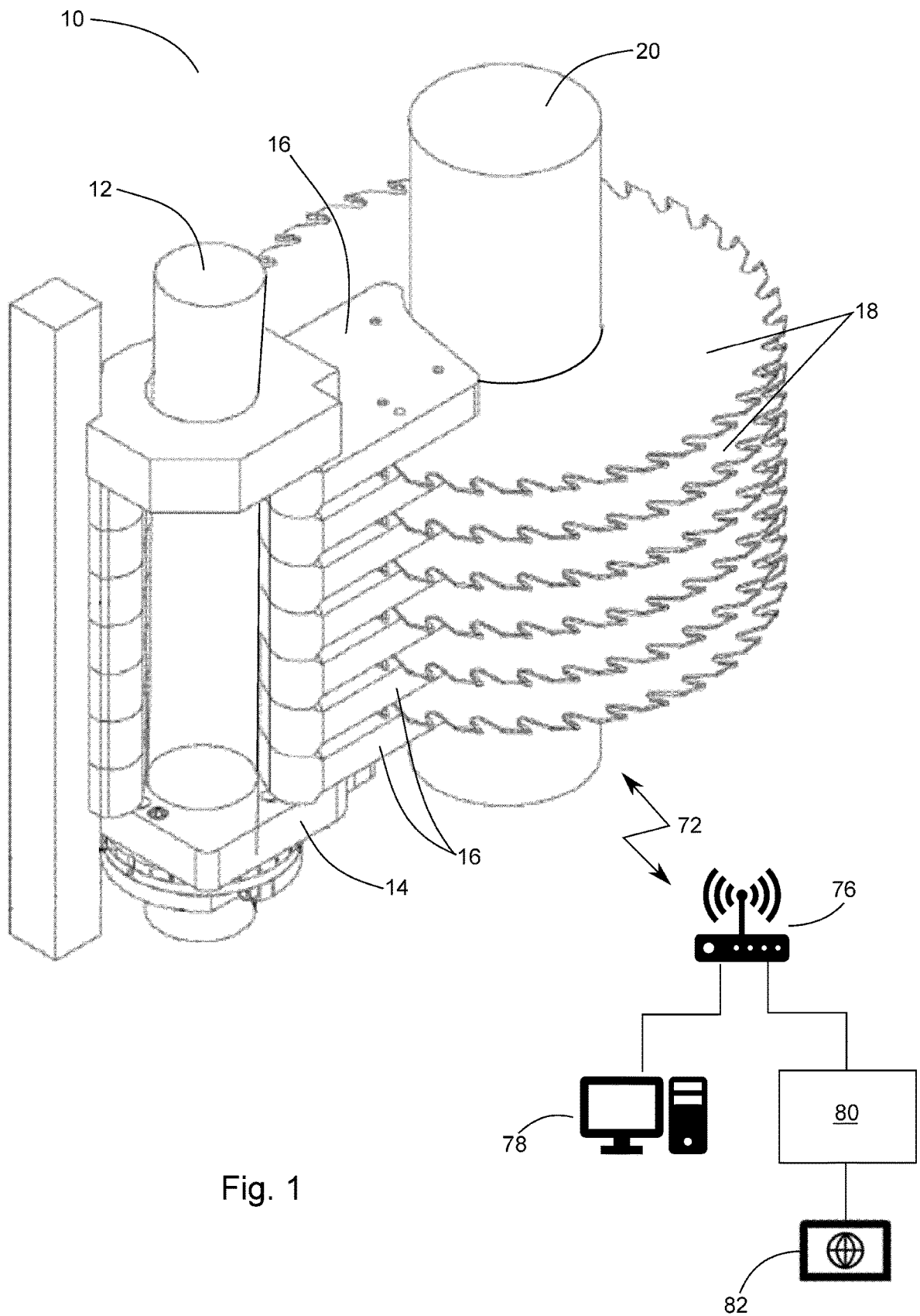
FIG. 1 depicts a saw arbor guide assembly in accordance with an embodiment of the invention.
Figure 2:
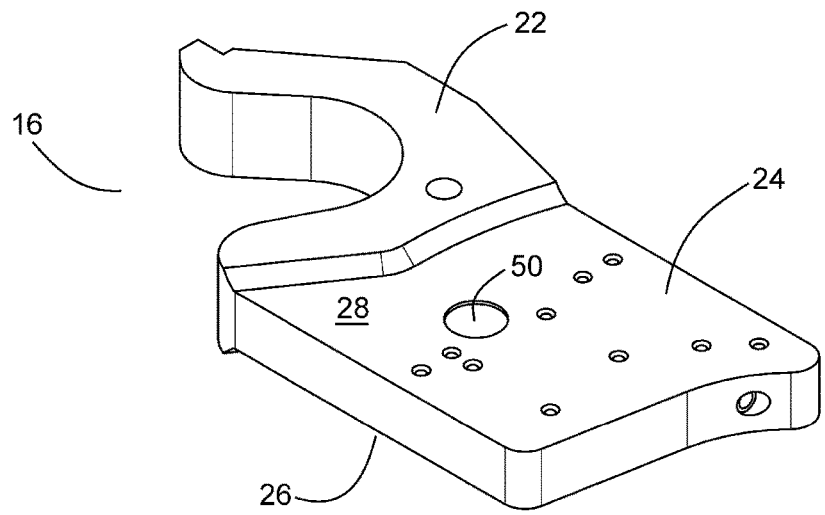
FIG. 2 is a perspective view of a saw guide in accordance with an embodiment of the invention.
Figure 3:
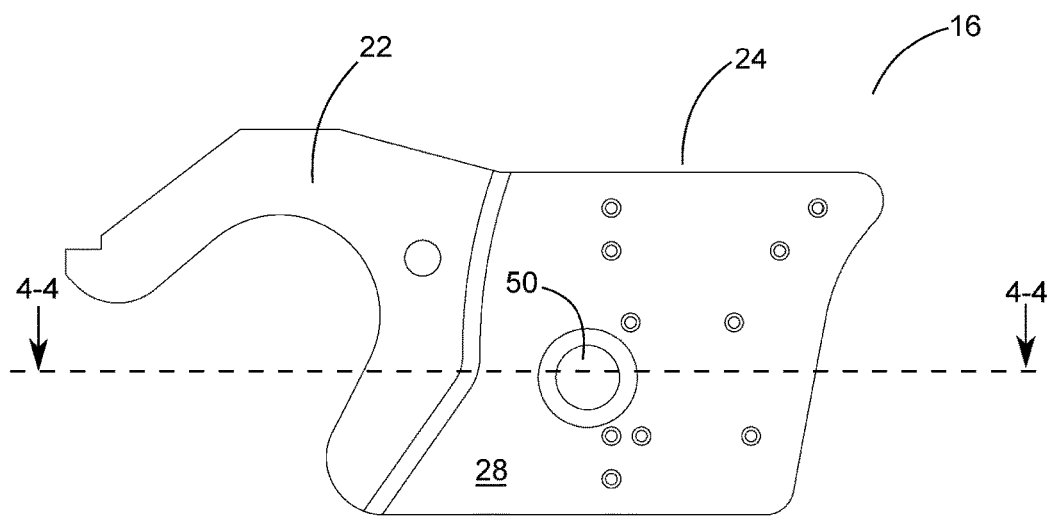
FIG. 3 is a top view of the saw guide of FIG. 2.

Referring to FIG. 1, in one embodiment of the invention, a saw arbor guide assembly 10 comprises a guide post 12 mounted to a guide manifold 14. The guide post 12 may be substantially cylindrical, but other configurations are also possible. A plurality of saw guides 16 are arranged, generally in a stacked configuration, on the guide manifold 14 and are mounted to the guide post 12. The location and spacing of the saw guides 16 are such so as to allow them to interact with one or more saw blades 18 that are attached to a rotating arbor 20 during cutting operation. In particular, the saw guides 16 are arranged such that one of the saw blades 18 travels in between adjacent saw guides 16 during operation.

The saw arbor guide assembly 10 depicted in FIG. 1 is a vertical single arbor (VSA) configuration (with a single set of saw guides 16 and saw blades 18 arranged vertically). It is understood that other configurations are also possible, such as a vertical double arbor (VDA) configuration (with two sets of saw guides 16 and saw blades 18 arranged vertically), a horizontal single arbor (HSA) configuration (with a single set of saw guides 16 and saw blades 18 arranged horizontally), a horizontal double arbor (HDA) configuration (with two sets of saw guides 16 and saw blades 18 arranged horizontally), and a Quad configuration (with four sets of saw guides 16 and saw blades 18 arranged horizontally).

Figure 4:
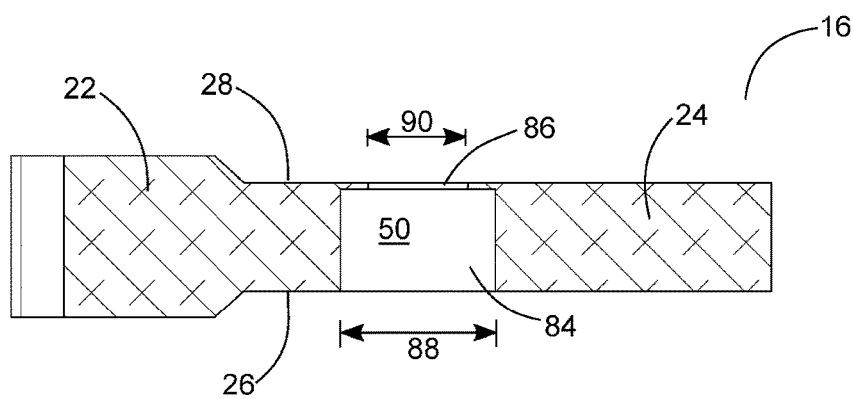
FIG. 4 is a cross-sectional view of the saw guide of FIG. 2, taken along line 4-4 of FIG. 3.
Figure 5:
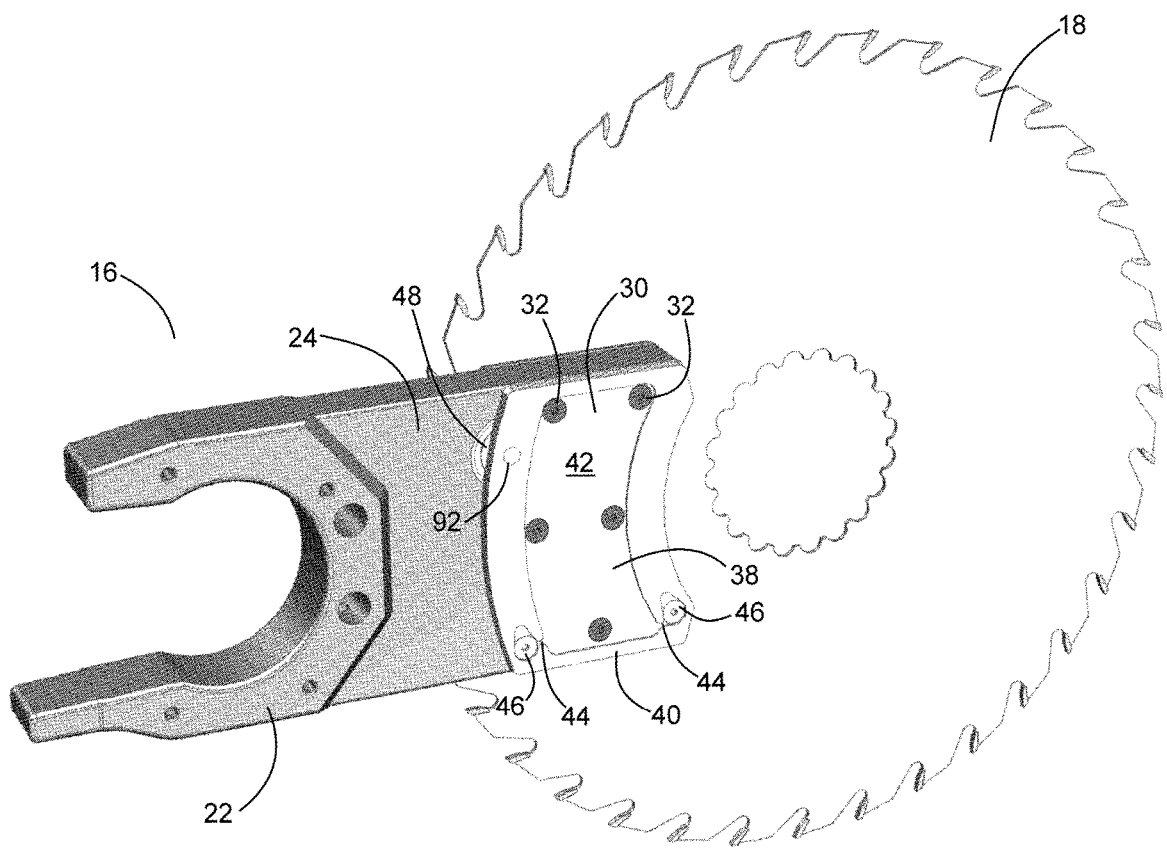
FIG. 5 depicts a saw guide and a saw blade in accordance with an embodiment of the invention.
Figure 6:
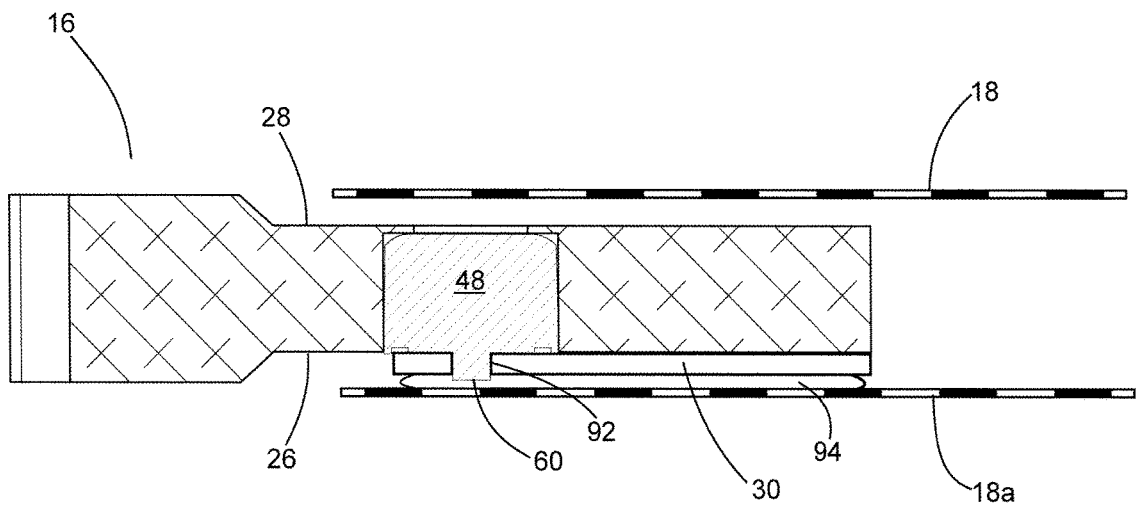
FIG. 6 is a cross-sectional view of the saw guide of FIG. 2, taken along line 4-4 of FIG. 3 and including two saw blades.
Figure 7:
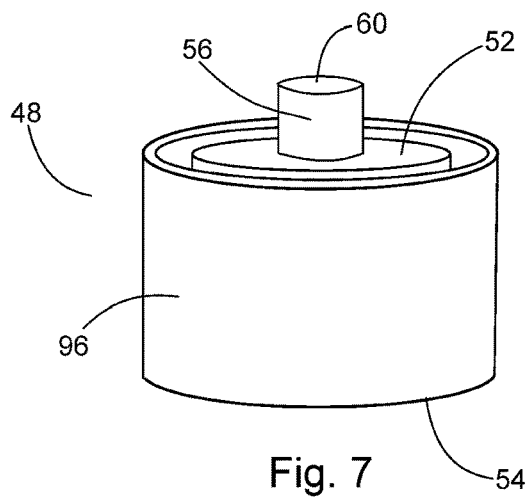
FIG. 7 is a perspective view of a temperature sensor.
Figure 8:
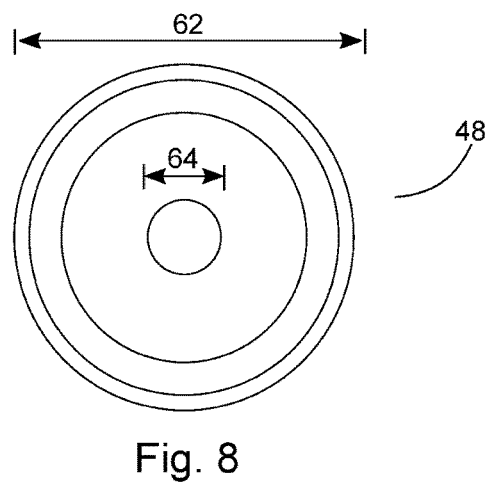
FIG. 8 is a top view of the temperature sensor of FIG. 7.
Figure 9A:
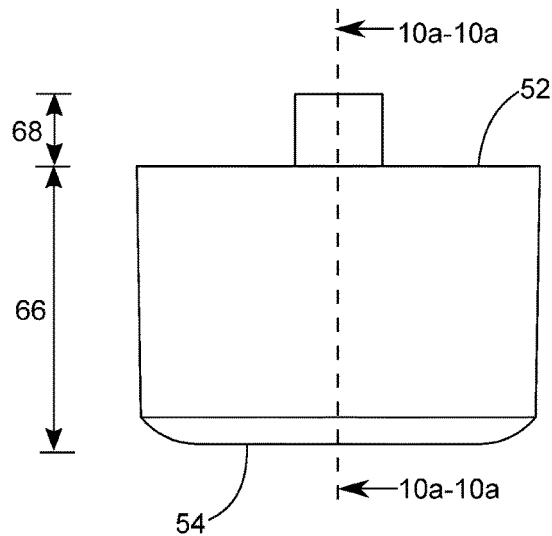
FIGS. 9A and 9B are side views of the temperature sensor unit of FIG. 7, before and after machining of the tip surface.
Figure 9B:
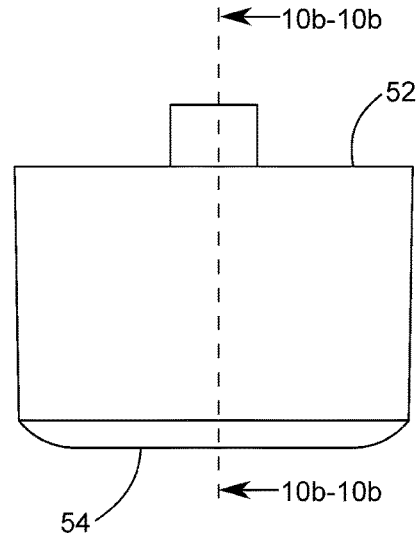
Figure 10A:
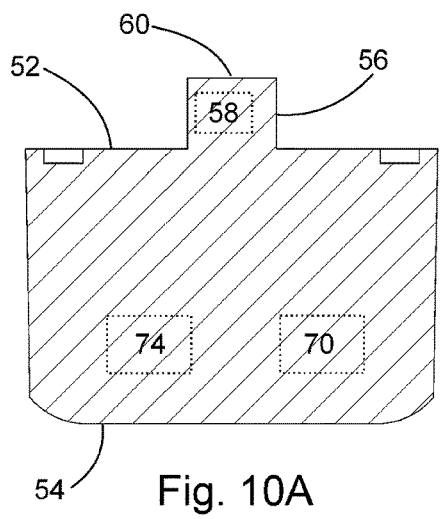
FIGS. 10A and 10B are cross-sectional views of the temperature sensors of FIGS. 9A and 9B, respectively, taken along lines 10a-10a and 10b-10b of FIGS. 9A and 9B.
Figure 10B:
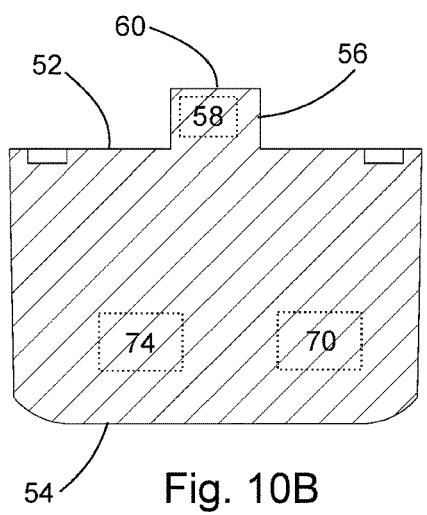

FIGS. 2 to 6 depict at least one of the saw guides 16. It comprises a head 22 and a body 24. The head 22 is adapted to attach to the guide post 12, while the body 24 is adapted to, in conjunction with adjacent saw guides 16, interact with one or more of the saw blades 18. The body 24 comprises opposing first and second faces 26, 28. One or both of the first and second faces 26, 28 may accommodate a generally flat pad 30 for interacting with the saw blades 18. In one embodiment, the pad 30 may be made from Babbitt material; however, it is understood that the pad 30 may also be made from other materials suitable as a bearing/wear surface. For ease of illustration, FIG. 5 only shows a single saw blade 18, but it is understood that the saw guide 16 may be located in between two saw blades 18 (for example, as shown in FIGS. 1 and 6).

The pad 30 may be attached to the body 24 using one or more pad fasteners 32. The pad fasteners 32 may be bolts that extend through pad openings 34 (not shown) on the pad 30 and fastener openings (not shown) on the body 24. However, it will be appreciated that other types of fasteners may be used for the pad fasteners 32 and that other methods for attaching the pad 30 to the body 24 are also possible.

The pad 30 may comprise an inner region 38 generally surrounded by an outer region 40. Preferably, the inner region 38 is of a lower thickness than the outer region 40, such that the inner region 38 forms a depression with respect to the outer region 40. This relative difference in thicknesses of the inner, outer regions 38, 40 provides a pocket 42 for accommodating a cooling fluid 94 used to cool the saw blade 18 as it rotates across the surface of the pad 30.

The cooling fluid 94 may be introduced into the pocket 42 through fluid channels 44 that extend from a perimeter of the inner region 38 into the outer region 40. The fluid channels 44 transfer the cooling fluid 94 from saw guide passages 46 within the saw guide 16.

Referring to FIG. 5, the saw guide 16 further comprises one or more temperature sensors 48. The temperature sensors 48 may be located on different areas of the saw guide 16. In the embodiment shown in FIG. 5, the temperature sensor 48 is generally located within the body 24. In this embodiment, the body 24 comprises one or more sensor channels 50 that extend between the first and second faces 26, 28 and that are adapted to receive the temperature sensors 48.

Referring to FIGS. 7 to 10B, the temperature sensor 48 comprises a sensor body 96 with generally opposing first and second sensor faces 52, 54 that are preferably substantially parallel to each other. In the embodiment shown in FIGS. 7 to 10B, the sensor body 96 has a substantially cylindrical shape; however, it is understood that other shapes are also possible. A tip 56 extends from the first sensor face 52. The tip 56 generally encloses a thermocouple 58 for measuring temperature. The thermocouple 58 may use infrared temperature sensing in order to measure temperature of, for example, the saw blade 18. In another embodiment, the tip 56 may be made from a conductive material that encloses the thermocouple 58. The thermocouple 58 may then measure changes in temperature via conduction through contact with one or more of the pad 30, the cooling fluid 94, or the air. For example, as the saw blades 18 rotate, the temperature of the pad 30, the cooling fluid 94, or the air may increase, and this increase in temperature may be detected by the thermocouple 58. This may be used to estimate the increase in temperature of the saw blades 18.

Preferably, the tip 56 comprises a tip surface 60 that is preferably substantially parallel to the first sensor face 52. The tip surface may be made from a metallic material (e.g. brass) that would allow the tip surface 60 to be machined in order to achieve an appropriate clearance between the tip surface 60 and the saw blade 18. In one embodiment, the appropriate clearance between the tip surface 60 and the saw blade 18 is approximately 0.0015 inches. Preferably, the clearance is between 0.0010 and 0.0025 inches. However, it is understood that other distances (including, for example, 0.0025 to 0.0030 inches) are also possible. Furthermore, the distance between the tip surface 60 and the thermocouple 58 inside the tip 56 is preferably at least 0.050 inches, although it is understood that other distances are also possible.

Referring to FIGS. 7 to 10B, in one embodiment, the temperature sensor 48 has a sensor diameter 62 of preferably approximately 44 millimeters, with the tip 56 having a tip diameter 64 of preferably approximately 0.375 inches. The temperature sensor 48 has a first tip height 66 (between the first and second sensors faces 52, 54) of preferably approximately 1.155 inches. The temperature sensor 48 also has a second tip height 68 (between the first sensor face 52 and the tip surface 60) of approximately 0.300 inches before machining. After machining the tip surface 42, the second tip height 68 may be approximately 0.2535 inches, although the exact value of the second tip height 68 will depend on the amount of machining required to achieve the appropriate clearance between the tip surface 60 and the saw blade 18.

Although FIGS. 7 to 10B depict one particular embodiment of the temperature sensor 48, it is understood that other shapes and dimensions for the temperature sensor 48 are also possible. For example, instead of the generally cylindrical shape depicted in FIGS. 7 to 10B, the temperature sensor 48 may also take on a more square, oval, diamond, or other suitable shape.

As a result of the placement and orientation of the temperature sensor 48, the tip 56 does not come into physical contact with the saw blades 18 while they are rotating. During operation of the saw arbor guide assembly 10, the saw blades 18 generally do not come into physical contact with the pads 30. For example, the pads 30 may be machined to have a clearance of approximately 0.0015 inches from the corresponding saw blades 18. Instead, the saw blades 18 rotate and ride upon a thin layer of the cooling fluid 94 separating the saw blades 18 and the pads 30. Therefore, because of the placement and orientation of the temperature sensor 48, both the tip 56 and the pad 30 may be physically separated from the saw blades 18 such that they do not directly contact the saw blades 18 while the saw blades 18 are rotating. This reduces the amount of wear on the saw blades 18 created by the friction of any such contact. As such, the temperature sensor 48 has no greater effect on the operation of the saw blades 18 than the pads 30. For example, the temperature sensor 48 is able to detect changes in the ambient temperature of the saw blade 18, which may be used as an indication of the temperature of the saw blade 18 and more particularly, may be used as an indication of whether the temperature of the saw blade 18 is above normal operating tolerance.

The temperature sensor 48 preferably also comprises a processor 70 for processing temperature data 72 collected by the thermocouple 58 and a transceiver 74 for communicating with a gateway 76. The temperature data 72 comprises data regarding temperature (or changes in temperature) measured by the thermocouple 58 and is intended to be an indication of the temperature (or changes in temperature) of the saw blade 18 as it rotates past the tip surface 60. The saw blade 18 for which the temperature is measured is not shown in FIG. 5 but is shown in FIG. 6 and depicted as 18*a*.

In one embodiment, the processor 70 is configured to transmit the temperature data 72 using the transceiver 74 to the gateway 76, which is connected (wired or wirelessly) to a client computer 78. The transmission of the temperature data 72 from the transceiver 74 to the gateway 76 may be wired or wirelessly. In the event that the transmission is conducted wirelessly, it may use one of a number of wireless communications protocols, including WiFi, cellular, Bluetooth, radio signals, or the like. In another embodiment, the processor 70 is configured to transmit the temperature data 72 using the transceiver 74 to the gateway 76, which is connected to a central server 80. In this embodiment, the temperature data 72 may then be accessed through the central server 80, such as using a web portal 82.

Referring to FIG. 4, the sensor channels 50 preferably comprise first and second channel portions 84, 86 that are adjacent to each other. The first channel portion 84 extends into the body 24 from the first face 26, while the second channel portion 86 extends into the body 24 from the second face 28 until the first channel portion 84 meets with the second channel portion 86.

Preferably, the first channel portion 84 has a first portion diameter 88 that is approximately the same as, or slightly larger than, that of the sensor diameter 62 so as to allow the temperature sensor 48 to snugly fit into the first channel portion 84. For example, the first portion diameter 88 may be approximately 1.740 inches. The depth of the first channel portion 84 may be approximately 1.150 inches.

The second channel portion 86 has a second portion diameter 90 that is less than that of the sensor diameter 62 so that the temperature sensor 48 is unable to completely pass through the sensor channel 50. For example, the second portion diameter 90 may be approximately 1.125 inches. The depth of the second channel portion 86 may be much less than the depth of the first channel portion 84. For example, it may be approximately 0.070 inches. Preferably, when the temperature sensor 48 is fitted within the sensor channel 50, the depth of the first channel portion 84 is such that the first sensor face 52 is substantially flush with the first face 26. In another embodiment, the first sensor face 52 would extend approximately 0.005 inches above the first face 26.

In addition to preventing the temperature sensor 48 from passing through the body 24, the second channel portion 86 also aids in the transmission of wireless communications between the transceiver 74 and the gateway 76 by not requiring the transmission of wireless communications through the solid material of the body 24.

Although the embodiment depicted in FIG. 4 shows the sensor channels 50 comprising first and second channel portions 84, 86, it is also possible that the sensor channels 50 comprise only first channel portion 84. In this embodiment, the temperature sensor 48 may be held in place within the sensor channel 50 by the pads 30 present on the first and second faces 26, 28.

Referring to FIGS. 5 and 6, the pad 30 further comprises one or more pad channels 92 that extend through the pad 30 and are located so as to receive the tips 56 of the one or more temperature sensors 48. As such, the pad channels 92 preferably have a diameter that is approximately the same as, or slightly larger than, that of the tip diameter 64. When the temperature sensors 48 are placed within the sensor channels 50 and the pad 30 is fastened onto the body 24, the pad 30 is able to hold in place the temperature sensors 48 and prevent them from exiting the sensor channels 50. Other mechanisms for holding the temperature sensors 48 in place within the sensor channels 50 are also possible.

The process for installing the temperature sensors 48 into the saw guide 16 will now be described.

A number of holes corresponding to the number of temperature sensors 48 are first drilled partially into the first face 26 of the body 24, forming at least a portion of the first channel portions 84. After the holes have been partially drilled into the first face 26, the temperature sensors 48 are placed within the holes to ensure proper fit. If necessary, the holes may be drilled further if they are not of sufficient depth for the first channel portion 84.

Once the appropriate depth of the holes has been achieved, the temperature sensors 48 are removed, and the second channel portions 86 are formed by drilling from the second face 28 until the first channel portion 84 is reached, thereby completing the sensor channels 50. As noted above, the second portion diameter 90 is preferably less than the first portion diameter 88. The temperature sensors 48 are then replaced into the sensor channels 50 from the first face 26 to complete the installation.

In the embodiment shown in FIGS. 2 to 6, the saw guide 16 comprises one sensor channel 50 for accommodating one temperature sensor 48. However, it is possible for multiple sensor channels 50 to be present on the saw guide 16 for accommodating multiple temperature sensors 48. In addition, in the embodiment shown in FIGS. 2 to 6, the temperature sensor 48 is configured to measure the temperature of the saw blade 18 that is proximate to the first face 26 of the saw guide 16. However, it is possible, especially when there are multiple sensor channels 50, for the temperature sensors 48 to be mounted so that they are extending from either the first face 26 or the second face 28 of the saw guide 16 (or a combination of both).

Preferably, for the saw arbor guide assembly 10, only some of the saw guides 16 will house the temperature sensors 48. For example, the saw arbor guide assembly 10 may have a total of three temperature sensors 48, with the temperature sensors 48 being located in the saw guides 16 that are proximate to the upper, middle, and lower portions of the guide post 12. However, it is understood that the number of temperature sensors 48 may be greater or less than three, and they be located on different portions of the guide post 12.

The temperature sensors 48 are preferably configured so that the transceivers 74 transmit the temperature data 72 at regular intervals (for example, every 5 seconds). As the temperature data 72 is received and processed by the client computer 78 or the central server 80, the temperature data 72 is checked to ensure that the recorded temperatures (or changes in temperature) are within normal tolerances. If the temperature data 72 indicates that the temperature of one or more of the saw blades 18 rotating proximate to the temperature sensors 48 is above tolerance, or that the changes in temperature of one or more of the saw blades 18 is greater than a certain pre-set amount, an appropriate warning may be generated by the client computer 78 or the central server 80. This warning may be displayed to the user. In another embodiment, the warning may cause corrective action to be taken, such as the introduction of additional amounts of the cooling fluid 94 to the saw guides 16 and/or adjusting the spacing between logs being fed into the saw arbor guide assembly 10.

Figure 11:
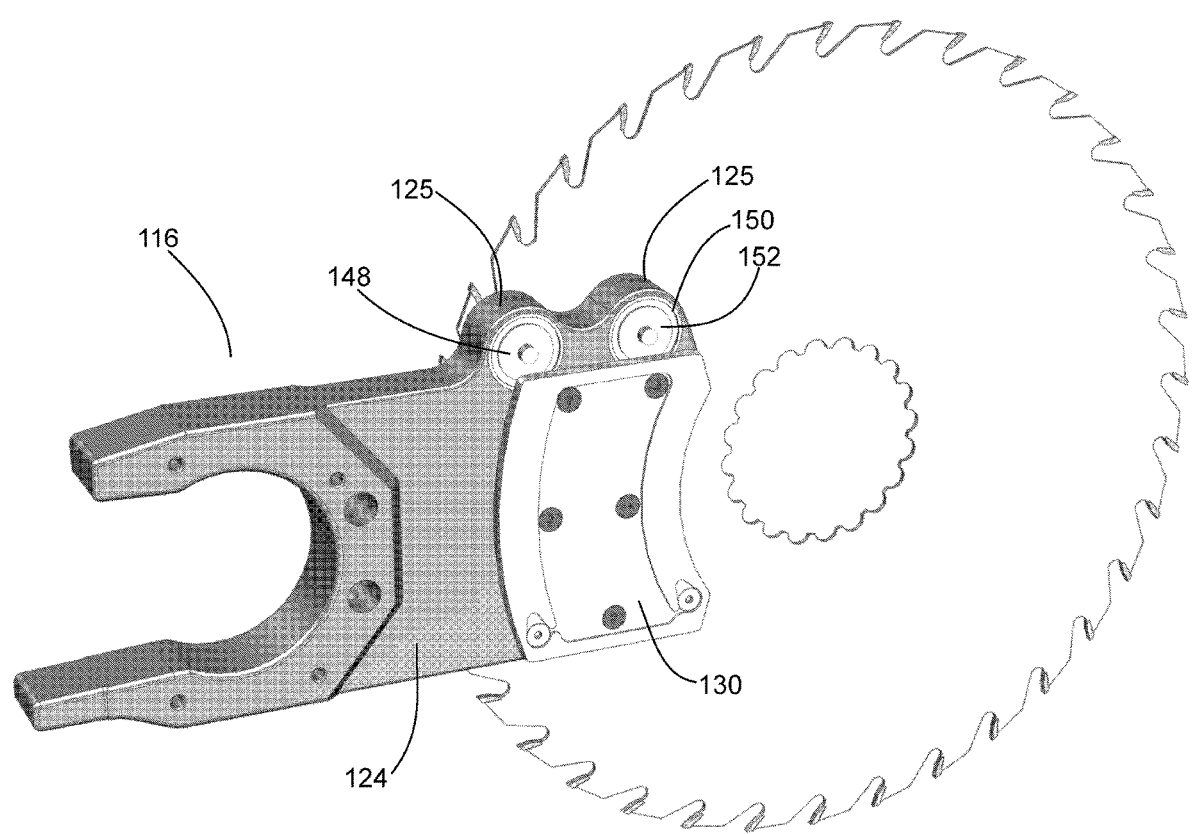
FIG. 11 depicts another embodiment of the saw guide and saw blade.

The location of the temperature sensors 48 relative to the body 24 may vary. FIG. 11 depicts a saw guide 116 in accordance with another embodiment of the invention. In this embodiment, the temperature sensors 148 are located substantially beyond a perimeter of the pad 130. The body 124 of the saw guide 116 may comprise one or more protrusions 125 for housing the temperature sensors 148. The sensor channels 150 are preferably located, at least in part, within the protrusions 125. For example, in the embodiment shown in FIG. 11, the saw guide 116 comprises two protrusions 125, with each of the protrusions 125 having one sensor channel 150 located, at least in part, within the protrusion 125. The temperature sensors 148 are housed within the sensor channels 150 (as with the previous embodiment). It is understood that although FIG. 11 depicts two protrusions 125, a greater or smaller number of protrusions 125 are also possible.

Preferably, at least a portion of the first sensor face 152 of the temperature sensors 148 is covered by the pad 130. This allows the pad 130 to hold in place the temperature sensors 148 within the sensor channels 150 by preventing the temperature sensors 148 from leaving the sensor channels 150 through the first face 126. However, it is also possible for the temperature sensors 148 to be completely beyond the perimeter of the pad 130, in which case the temperature sensors 148 may be held in place within the sensor channels 150 through some other mechanism, such as by mechanical fasteners (e.g. screws, brackets, retaining plates, etc.).

Figure 12:
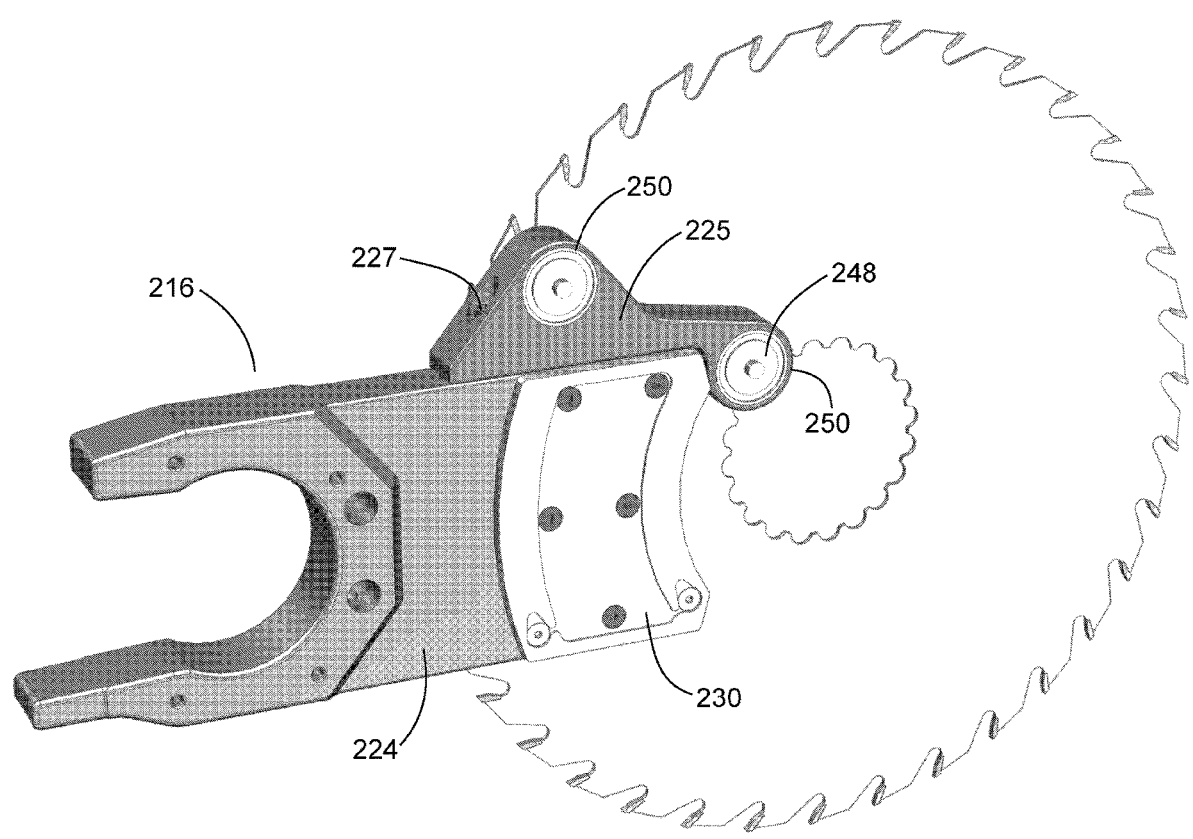
FIG. 12 depicts yet another embodiment of the saw guide and saw blade.

FIG. 12 depicts another embodiment of the saw guide 216, in which the temperature sensors 248 are preferably located beyond the perimeter of the pad 230. In this embodiment, the saw guide 216 comprises an arm 225 that is detachably connected to one or more sides of the body 224. The arm 225 may be connected to the body 224 using one or more arm fasteners 227 or any other suitable fastening mechanism. The arm 225 comprises one or more sensor channels 250 for housing the temperature sensors 248. In the example shown in FIG. 12, the arm 225 comprises two sensor channels 250, each housing one temperature sensor 248. The temperature sensors 248 may be located beyond the perimeter of the pad 230, such as by mechanical fasteners (e.g. screws, brackets, retaining plates, etc.).

Figure 13:
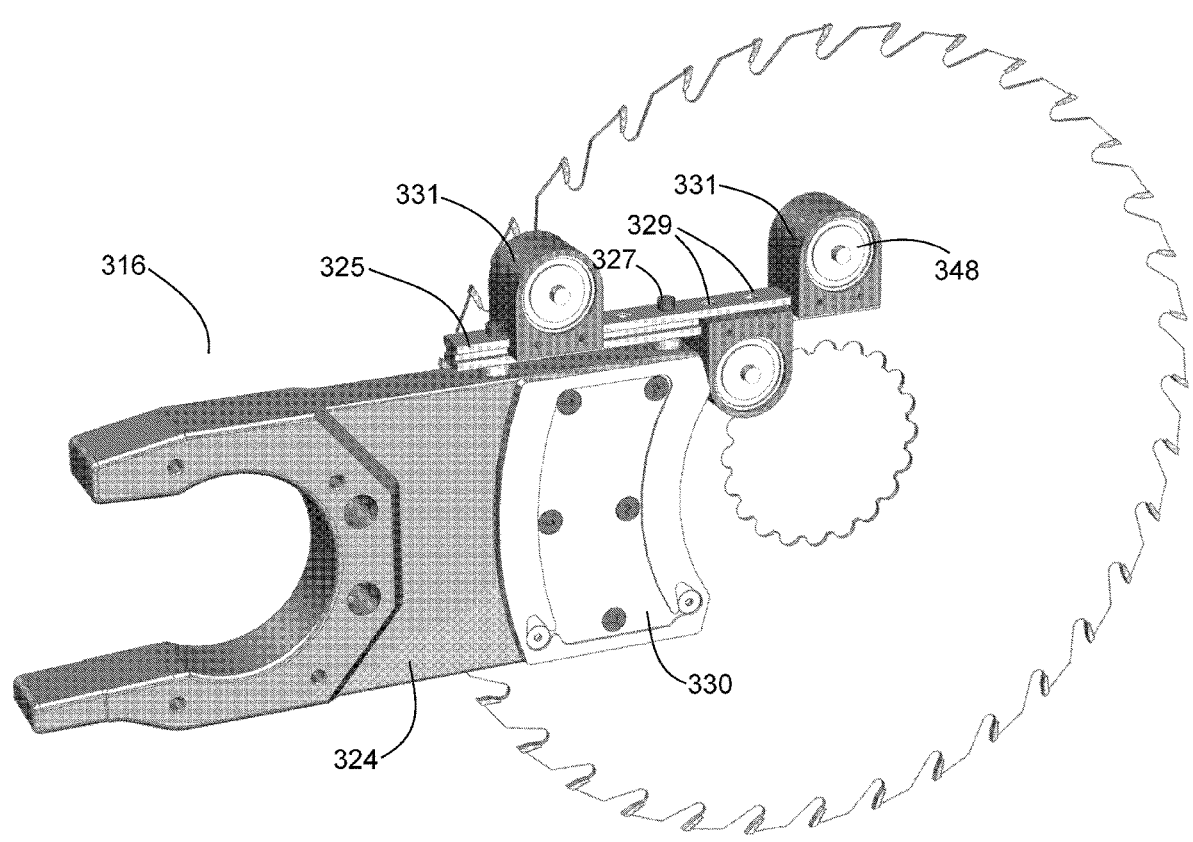
FIG. 13 depicts still another embodiment of the saw guide and saw blade.

FIG. 13 depicts yet another embodiment of the saw guide 316, in which the temperature sensors 348 are also preferably located beyond the perimeter of the pad 330. In this embodiment, the saw guide 316 comprises a rail 325 connected to one side of the body 324. In addition, one or more mounts 331 may be located on the rail 325. The precise location of the mounts 331 on the rail 325 may be adjusted by, for example, slidably moving the mounts 331 along the rail 325. In one embodiment, the mounts 331 may be fixed onto the rail 325 using one or more mount fasteners 327 (not shown) associated with each of mounts 331. For example, by loosening the mount fasteners 327 associated with one of the mounts 331, the mount 331 may then be moved along the rail 325 until the desired location is reached. The mount fasteners 327 can then be tightened, thereby fixing the mount 331 at that location. The rail 325 may comprise a plurality of rail openings 329 configured to accept the mount fasteners 327. The rail openings 329 allow the mount fasteners 327 to be secured at different locations along the rail 325, thereby allowing the mounts 331 to be moved to different locations along the rail 325. The rail 325 may be connected to the body 324 using one or more rail pins 331. The temperature sensors 348 may be located beyond the perimeter of the pad 330, such as by mechanical fasteners (e.g. screws, brackets, retaining plates, etc.).

It will be appreciated by those skilled in the art that the preferred embodiments have been described in some detail but that certain modifications may be practiced without departing from the principles of the invention.

What is claimed is:

1. A saw arbor guide assembly comprising:
   one or more arbors;
   one or more guide posts;
   a plurality of saw blades arranged on the one or more arbors;
   one or more saw guides arranged on the one or more guide posts, at least one of the one or more saw guides comprising:
      a head adapted to attach to one of the one or more guide posts;
      a body extending from the head, the body comprising:
         first and second faces; and
         one or more sensor channels extending between the first and second faces;
      a pad extending across at least one of the first and second faces, wherein the pad comprises one or more pad channels and wherein the pad faces a corresponding one of the plurality of saw blades; and one or more temperature sensors, wherein each of the one or more temperature sensors comprises:

a sensor body, the sensor body having a first diameter, wherein the sensor body is adapted to fit within at least a portion of one of the one or more sensor channels;

a tip extending from the sensor body, the tip having a second diameter and is adapted to extend through one of the one or more pad channels and be spaced apart from the corresponding one of the plurality of saw blades to provide a clearance between the tip and the corresponding one of the plurality of saw blades, wherein the second diameter is less than the first diameter; and a thermocouple enclosed within the tip, the thermocouple configured to measure a temperature of the corresponding one of the plurality of saw blades;

wherein the sensor body is held within the one or more sensor channels through engagement of the sensor body against the pad.

2. The saw arbor guide assembly of claim 1, wherein the pad is made of Babbitt material.

3. The saw arbor guide assembly of claim 1, wherein the pad further comprises an inner region with a first thickness and a surrounding outer region with a second thickness, wherein the first thickness is less than the second thickness.

4. The saw arbor guide assembly of claim 3, wherein the pad comprises one or more fluid channels adapted to convey cooling fluid into the inner region.

5. The saw arbor guide assembly of claim 1, wherein the sensor body is cylindrical.

6. The saw arbor guide assembly of claim 1, wherein the tip is made of a conductive material.

7. The saw arbor guide assembly of claim 6, wherein the tip is made of a metallic material.

8. The saw arbor guide assembly of claim 1, wherein the clearance is between 0.0010 and 0.0030 inches.

9. The saw arbor guide assembly of claim 8, wherein the clearance is approximately 0.0015 inches.

10. The saw arbor guide assembly of claim 1, wherein the one or more temperature sensors further comprise a transceiver for transmitting temperature data, the temperature data comprising the temperature of the corresponding one of the plurality of saw blades measured by the thermocouple.

11. A system for monitoring temperatures of a saw blade in a saw arbor guide assembly, the system comprising:

the saw blade;

a saw guide, the saw guide comprising:

first and second faces; and one or more sensor channels extending between the first and second faces;

a pad extending across at least one of the first and second faces, wherein the pad comprises one or more pad channels and wherein the pad faces the saw blade;

one or more temperature sensors, wherein each of the one or more temperature sensors comprises:

a sensor body, the sensor body having a first diameter, wherein the sensor body is adapted to fit within at least a portion of one of the one or more sensor channels;

a tip extending from the sensor body, the tip having a second diameter and is adapted to extend through one of the one or more pad channels and be spaced apart from the saw blade to provide a clearance between the tip and the saw blade, wherein the second diameter is less than the first diameter;

a thermocouple enclosed within the tip, the thermocouple configured to measure the temperatures of the saw blade; and a transceiver for transmitting temperature data, the temperature data comprising the temperatures of the saw blade; and a gateway configured to receive the temperature data;

wherein the sensor body is held within the one or more sensor channels through engagement of the sensor body against the pad.

12. The system of claim 11, wherein the gateway is further configured to generate a warning if the temperature data indicates that one of the temperatures of the saw blade is greater than a pre-set amount.

13. The system of claim 11, wherein the pad is made of Babbitt material.

14. The system of claim 11, wherein the pad further comprises an inner region with a first thickness and a surrounding outer region with a second thickness, wherein the first thickness is less than the second thickness.

15. The system of claim 14, wherein the pad comprises one or more fluid channels adapted to convey cooling fluid into the inner region.

16. An apparatus for a saw arbor guide assembly, the saw arbor guide assembly with one or more arbors and one or more guide posts, the apparatus comprising:

a plurality of saw blades configured to be arranged on the one or more arbors;

one or more saw guides configured to be arranged on the one or more guide posts, at least one of the one or more saw guides comprising:

a first face and a second face; and a sensor channel extending between the first face and the second face;

a pad extending across at least one of the first face and the second face, wherein the pad comprises a pad channel and wherein the pad faces a corresponding one of the plurality of saw blades; and a temperature sensor comprising:

a sensor body, the sensor body having a first diameter, wherein the sensor body is adapted to fit within at least a portion of the sensor channel;

a tip extending from the sensor body, the tip having a second diameter and is adapted to extend through the pad channel and be spaced apart from the corresponding one of the plurality of saw blades to provide a clearance between the tip and the corresponding one of the plurality of saw blades, wherein the second diameter is less than the first diameter;

a thermocouple enclosed within the tip, the thermocouple configured to measure a temperature of the corresponding one of the plurality of saw blades; and a transceiver for transmitting temperature data, the temperature data comprising the temperature of the corresponding one of the plurality of saw blades;

wherein the sensor body is held within the sensor channel through engagement of the sensor body against the pad.

17. The apparatus of claim 16, wherein the pad further comprises an inner region with a first thickness and a surrounding outer region with a second thickness, wherein the first thickness is less than the second thickness.

18. The apparatus of claim 16, wherein the clearance is between 0.0010 and 0.0030 inches.

19. The apparatus of claim 18, wherein the clearance is approximately 0.0015 inches.

20. The apparatus of claim 16, wherein the pad extends across at least the first face and wherein the sensor channel comprises:
- a first channel portion extending from the first face and having a first portion diameter; and
- a second channel portion extending between the second face and the first channel portion, the second channel portion having a second portion diameter, the second portion diameter being less than the first portion diameter;

wherein the sensor body is adapted to fit within the first channel portion.

\* \* \* \* \*